United States Patent [19]

Yasuda

[11] Patent Number: 5,096,157
[45] Date of Patent: Mar. 17, 1992

[54] PLANETARY ROLLER TYPE FLOW CONTROL VALVE

[75] Inventor: Shoji Yasuda, Komaki, Japan

[73] Assignee: Mitsubishi Jukogyo Kabushiki Kaisha, Tokyo, Japan

[21] Appl. No.: 675,257

[22] Filed: Mar. 27, 1991

[30] Foreign Application Priority Data

Mar. 28, 1990 [JP] Japan .................. 2-76804
Jan. 23, 1991 [JP] Japan .................. 3-6421

[51] Int. Cl.⁵ .................. F16K 31/04; F16K 7/06
[52] U.S. Cl. .................. 251/129.11; 251/205; 251/901; 137/625.65; 91/504; 92/12.2; 92/71; 417/222 R
[58] Field of Search .................. 251/129.11, 205, 901; 137/625.65; 91/504; 92/12.2, 71; 417/222

[56] References Cited

U.S. PATENT DOCUMENTS

| | | | |
|---|---|---|---|
| 4,161,184 | 7/1979 | Traut | 251/901 X |
| 4,718,453 | 1/1988 | Ahrens | 251/901 X |

FOREIGN PATENT DOCUMENTS

| | | |
|---|---|---|
| 929406 | 6/1955 | Fed. Rep. of Germany . |
| 1833069 | 4/1961 | Fed. Rep. of Germany . |
| 1448737 | 7/1966 | France . |
| 912831 | 12/1962 | United Kingdom . |

Primary Examiner—Arnold Rosenthal
Attorney, Agent, or Firm—Wenderoth, Lind & Ponack

[57] ABSTRACT

A novel planetary roller type flow control valve, which can precisely control a flow rate and has a small friction, is provided. The planetary roller type flow control valve comprises a plurality of planetary rollers having different diameters from one another and being externally contiguous to a roller serving also as an input shaft, a ring being internally contiguous to the same planetary rollers and having a predetermined width in its axial direction, a housing fitting around the same ring with its inner circumference partly kept in contact with the outer circumference of the same ring and held coaxial and liquid-tight with respect to the above-mentioned roller serving also as an input shaft, a fluid inlet provided at one angular position of the inner circumference of the same housing so as to be interceptable by the predetermined width of the above-mentioned ring, and a fluid outlet provided at another angular position of the inner circumference of the same housing so as to be interceptable by the predetermined width of the aforementioned ring.

17 Claims, 5 Drawing Sheets

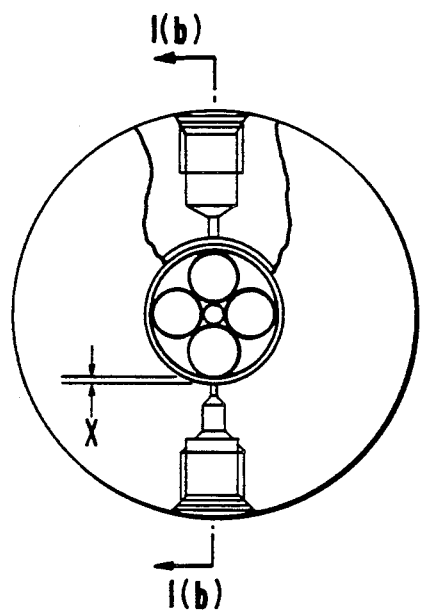
FIG. I(a)
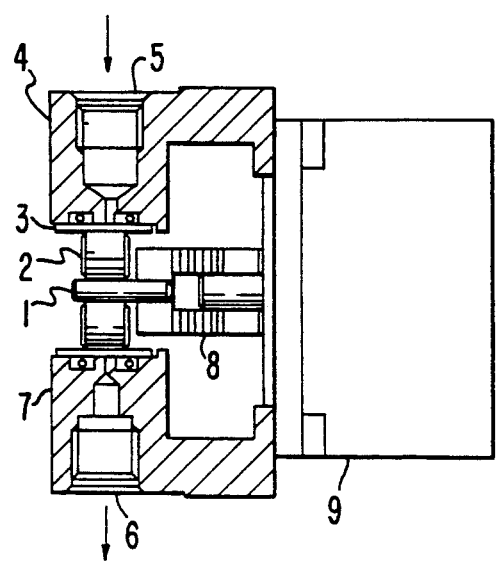
FIG. I(b)
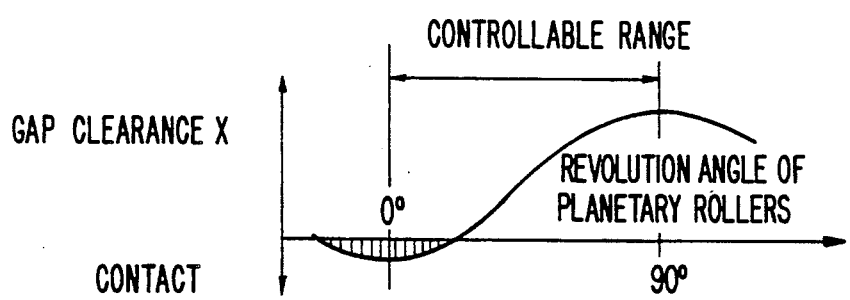
FIG. 2
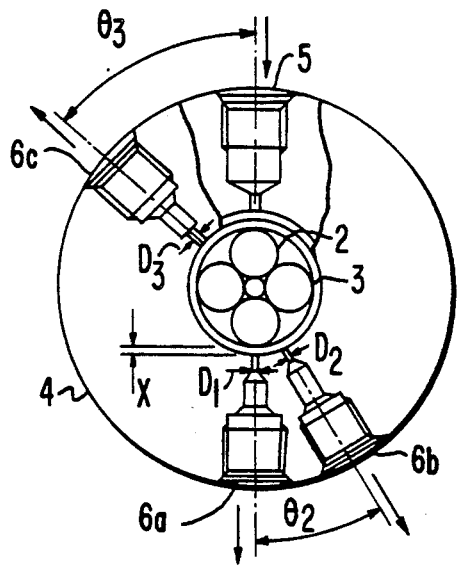
FIG. 3

PLANETARY ROLLER TYPE FLOW CONTROL VALVE

BACKGROUND OF THE INVENTION

1. Field of the Invention

The present invention relates to a planetary roller type flow control valve, which is available in an apparatus requiring extremely precise control for a minute flow rate such as control for a fuel flow rate and the like.

2. Description of the Prior Art

As representative flow control valves in the prior art, a needle valve type flow control valve as shown in FIG. 12, a slitted cylinder type flow control valve as shown in FIG. 13, and a slitted disc type flow control valve as shown in FIG. 14 are known. In the needle valve type flow control valve, an opening area of a fluid outlet 51 is varied by a needle valve 52 entering and coming out in the axial direction with respect to the fluid outlet 51 as shown in FIG. 12 and thereby a flow rate is controlled, and the entering and coming out of the needle valve 52 is effected by rotationally driving the needle valve 52 with a stepping motor 57. The needle valve 52 has its outer circumference tightly sealed by a seal ring 54 so that fluid entering through a fluid inlet 53 may not leak out in the opposite direction. It is to be noted that reference numeral 56 denotes a coupling member between the needle valve 52 and the stepping motor 57.

In the slitted cylinder type flow control valve, a flow rate is controlled by a notch or hole 34 formed in a shaft of a stepping motor 36 opening and closing a slit 33 drilled on the side of a fluid inlet 32 according to rotation of the shaft as shown in FIG. 13. It is to be noted that in this figure reference numeral 31 denotes a fluid outlet and numeral 35 denotes a seal member.

In the slitted disc type flow control valve, a flow rate is controlled by a notch or hole 44 in a disc 49, which is rotatably held in contact with a wall provided in perpendicular to a fluid outlet 41 within a chamber between a fluid inlet 42 and the fluid outlet 41, opening and closing a slit 43 in the same wall according to rotation of the disc 49 as shown in FIG. 14. In this figure, reference numeral 47 denotes reduction gears for transmitting rotation of a stepping motor 46 to the disc 49 while appropriately reducing the rotational speed, numeral 48 denotes a preloading spring for making a pressing force of the disc 49 against the wall sufficient, and numeral 45 denotes a seal member.

The above-described flow control valves (hereinafter called simply "valve") in the prior art involved the following problems to be resolved.

That is, in order to precisely control a minute flow rate, it is necessary to exactly regulate a throttle area of 0.1 mm$^2$ or less. However, in the flow control valve of needle valve type in the prior art, despite of the fact that a needle valve having a diameter and a stroke of 0.4 mm or less and a driving device (a combination of a ball screw and a stepping motor) were necessitated, there was a problem that due to machining errors a sufficient precision could not be obtained, and also there was a problem that upon full closure a valve seat for a needle would wear and hence its durability was poor. In the slitted type valve and slitted disc type valves in the prior art, a slit of about 0.02 mm$\times$5 mm was necessary, hence there was a problem that a possibility of foreign matters in fluid such as fuel or the like blocking the slit was large, also despite of the fact that in order to realize full closure it is necessary to make a gap clearance between slide surfaces zero, in the slitted cylinder type valve it was impossible to be realized, in the slitted disc type valve it was necessary to hold slide surfaces in press contact by means of a spring or the like, and there was a problem that friction upon driving would become large.

Furthermore, in the case where the needle valve or the slitted cylinder type and slitted disc type valves in the prior art are driven by a stepping motor controlled by a digital controller, it is necessary to enlarge a driving force and also enhance a control resolution by making use of a speed reducing device (a ball screw, a gearbox or the like). However, since a driving torque of a stepping motor used for control purpose is normally as small as several kg·cm, in order to fulfil this requirement it is necessary to use a speed reducing device having a sufficiently large reduction ratio so as to overcome a frictional force of a needle valve or a slit valve. But, if large speed reduction is effected, a response characteristic is degraded, and so, there is a problem that an aimed control function cannot be achieved.

SUMMARY OF THE INVENTION

It is therefore one object of the present invention to provide an improved planetary roller type flow control valve, which is free from the above-mentioned shortcomings of the flow control valves in the prior art.

A more specific object of the present invention is to provide a planetary roller type flow control valve which can precisely control a minute flow rate of fluid without necessitating a large driving torque nor an additional speed reducing device having a large reduction ratio.

In the present invention, there is provided a planetary roller type flow control valve comprising a plurality of planetary rollers having different diameters from one another and being externally contiguous to a roller serving also as an input shaft, a ring being internally contiguous to the planetary rollers and having a predetermined width in its axial direction, a housing fitting around the ring with its inner circumference partly kept in contact with the outer circumference of the ring and held coaxial and liquid-tight with respect to the roller serving also as an input shaft, a fluid inlet provided at one angular position of the inner circumference of the housing so as to be interceptable by the predetermined width of the ring, and a fluid outlet provided at another angular position of the inner circumference of the housing so as to be interceptable by the predetermined width of the ring.

According to the present invention, owing to the above-described structural features, the subject planetary roller type flow control valve operates in the following manner.

That is, the gap clearance between the ring and the housing produced in the case of giving a difference in diameter to the planetary rollers would have a distribution along the circumferential direction, and flow rate control is effected in the range where the gap clearance varies from the minimum to the maximum. For instance, in the case where a difference in diameter is given to two pairs of planetary rollers disposed at diametrically opposed positions and a speed reduction ratio of the planetary rollers is 6, 1½ revolutions of the input shaft becomes a controllable range, and with respect to a torque, a resolution and a response characteristic of the roller serving also as an input shaft, appropriate properties can be obtained. In addition, since the planetary rollers in themselves achieve the function of reduction gears, reduction gears would become unnecessary, and thus reduction of a number of component parts would be resulted.

When it is necessitated to perfectly shut out a flow rate, it is only necessary to tighten the fitting between the ring and the housing and to enhance a contact surface pressure. Also, if the planetary rollers are made hollow to weaken a rigidity, then a stable contact surface pressure can be obtained.

In addition, since the input shaft of the first-featured planetary roller type flow control valve can serve also as a rotary shaft of a driving device, and also the planetary rollers can be also used as bearings, in addition to the advantages of the above, there are additional advantages that a number and a weight of the component parts can be reduced.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings:

FIG. 1 shows a first preferred embodiment of the present invention, FIG. 1(a) being a front view, and FIG. 1(b) being a cross-section side view;

FIG. 2 is a diagram showing the relation between a revolution angle of a planetary roller and a gap clearance between a housing and a ring, through which fluid passes;

FIG. 3 is a front view of a second preferred embodiment of the present invention;

DESCRIPTION OF THE PREFERRED EMBODIMENT

Figure 4:
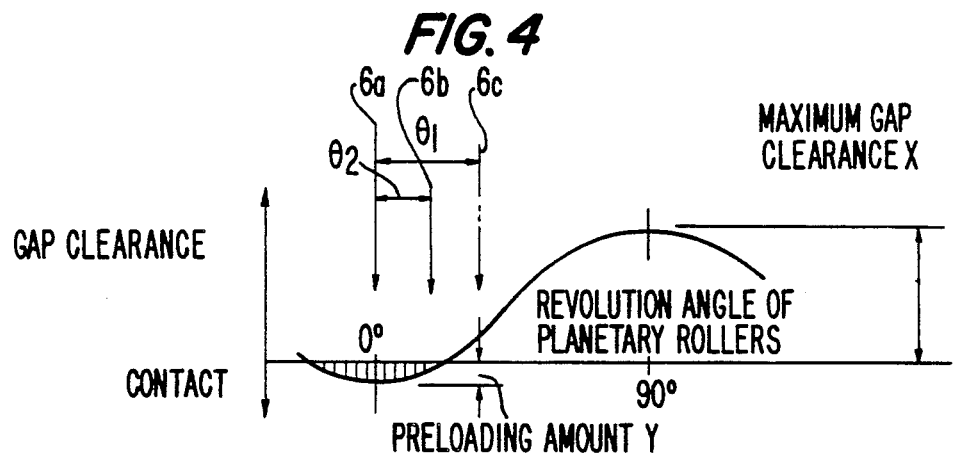
FIG. 4 is a diagram similar to that shown in FIG. 2 for the first preferred embodiment but relevant to the second preferred embodiment.

Now a fuel flow control valve of a gas turbine engine according to a first preferred embodiment of the present invention will be described with reference to FIGS. 1 and 2. FIG. 1 shows a construction of a fuel flow control valve according to this preferred embodiment, FIG. 1(a) being a front view partly cut away, and FIG. 1(b) is a cross-section side view of the construction shown in FIG. 1(a), that is, a cross-section view taken along line B—B in FIG. 1(a) as viewed in the direction of arrows.

In FIG. 1, two pairs of four planetary rollers 2 having different diameters from one another are externally contiguous to an input shaft 1 of roller shape and internally contiguous to a ring 3 having a predetermined width in its axial direction, and are accommodated within a housing 4 jointly with the ring 3, and this housing 4 is fitted around the outer circumference of the ring 3 with its inner circumference partly kept in contact with the outer circumference of the ring 3. One end of the input shaft 1 is connected via a coupling member 8 with a stepping motor 9 fixed to the housing 4, hence if the stepping motor 9 rotates, then the input shaft 1 also rotates, the planetary rollers 2 revolve around the input shaft 1 while rotating about their own axes, and consequently the ring 3 also rotates within the housing 4. Between the housing 4 and the outer circumference of the ring 3 are fitted seal rings 7, and at one angular position of the inner circumference of the housing 4, a fluid inlet 5 extends therethrough in the radial direction, while at another angular position a fluid outlet 6 extends therethrough.

Next, with respect to the operation of the flow control valve having the above-mentioned construction, description will be made with reference to FIG. 2. When the planetary rollers 2 having a difference in their diameters revolve around the outer circumference of the input shaft 1, the distance corresponding a radius between the outer circumference of the ring 3 and the axis of the input shaft 1 would differ depending upon the angular position about the axis, accordingly between the inner circumference of the housing 4 and the ring 3 coexist a region where they are held in press contact with each other and another region where, on the contrary, a gap clearance is formed therebetween, and the angular positions of these regions about the axis would change every moment according to the revolution. Symbol X in FIG. 1(a) denotes this gap clearance, and FIG. 2 is a diagram showing this change while taking the magnitude of this gap clearance X or the degree of the press contact along the ordinate and the revolving angle of the planetary rollers 2 along the abscissa. As will be apparent from these figures, by controlling the difference in diameter of the planetary rollers 2, a desired gap clearance X is formed, and so, a flow rate can be arbitrarily controlled.

Next, description will be made on a second preferred embodiment of the present invention with reference to FIGS. 3 and 4.

While the first preferred embodiment was an embodiment in which the fluid outlet 6 was provided at one location of the housing 4, the second preferred embodiment is an embodiment in which fluid outlets are provided at three locations along the circumferential direction, and with reference to FIG. 3, along the circumference of the housing 4, fluid outlets 6a, 6b and 6c are provided at three locations for one fluid inlet 5, so that flow rate characteristics are controlled according to a preset flow rate schedule by rotation of an input shaft 1. It is to be noted that the construction other than the illustrated section is similar to that shown in FIG. 1.

FIG. 4 is a diagram corresponding to that shown in FIG. 2 depicted for this particular embodiment, in which $\theta_1$ represents an angle of the sum of $\theta_3$ in FIG. 3 plus 180°, and $\theta_2$ represents an angle corresponding to $\theta_2$ in FIG. 3.

A principal parameters, required for a plurality of flow controls as is the case with this preferred embodiment, are timing of switching from an intercepted condition to an opened condition and a flow rate variation ratio. With regard to the timing, it can be adjusted by the phases ($\theta_2$ and $\theta_3$ in FIG. 4) of the respective fluid outlets 6a, 6b and 6c and the ratio of the preloading amount to the maximum gap clearance (i.e. Y to X in FIG. 4). With regard to the flow rate variation ratio, it can be adjusted by the diameters ($D_1$, $D_2$ and $D_3$ in FIG. 3) of the bores of the fluid outlets 6a, 6b and 6c. For instance, in the case where the subject valve is used as a fuel flow control valve for a gas turbine engine, the valve could be utilized in such manner that the fluid outlet 6a may be used as a fine nozzle having an extremely small bore diameter for feeding fuel for ignition purpose, the fluid outlet 6b may be use as a small flow rate nozzle having a small bore diameter for feeding fuel for idling operation purpose, and the fluid outlet 6c may be used as a large flow rate nozzle for feeding fuel for normal operation purpose. It is to be noted that the number of the fluid outlets should not be limited to three, but it could be increased or decreased, if desired.

Figure 5:
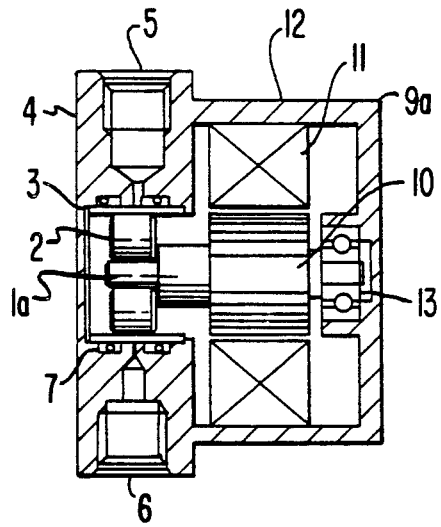
FIG. 5 is a cross-section side view of a third preferred embodiment of the present invention.

Next, a third preferred embodiment of the present invention will be described with reference to FIG. 5.

While both the above-described first and second preferred embodiments employed the construction that the planetary rollers 2 and the stepping motor 9 are formed separately, and in order to absorb misalignment between the axes of the respective components a coupling member 8 is used, the planetary rollers 2 inherently possess a capability of a bearing, and so, they can also serve as a bearing on one side of the stepping motor 9.

The third preferred embodiment is a flow control valve constructed from the above-mentioned view point, in which reference numeral 1a designates a rotary shaft serving also as a drive shaft of a stepping motor 9a which will be described later, and planetary rollers 2 perform revolution around this rotary shaft 1a as well as rotation about its own axis. The stepping motor 9a consists of a motor rotor 10, motor coil 11, motor housing 12 and a bearing 13 for supporting one end of the rotary shaft 1a as shown in the figure, and a role of another bearing at the other end corresponding to the bearing 13 is played by the aforementioned planetary rollers 2. With regard to the other construction, this embodiment is basically similar to the first and second preferred embodiments.

In the case of this preferred embodiment, in addition to the fact that advantages similar to those of the first and second preferred embodiments are provided, since the rotary shaft 1a of the stepping motor 9a also serves directly as an input shaft of the planetary rollers 2 and the planetary rollers also serve as a bearing, there is no need to separately prepare an input shaft nor a coupling member as is the case with the first and second preferred embodiments and also only one bearing can suffice, hence there is an advantage that a number of parts, a weight and a cost are all reduced and the valve can be small-sized.

Next, a fourth preferred embodiment of the present invention will be described with reference to FIGS. 6 to 9.

Figure 7:
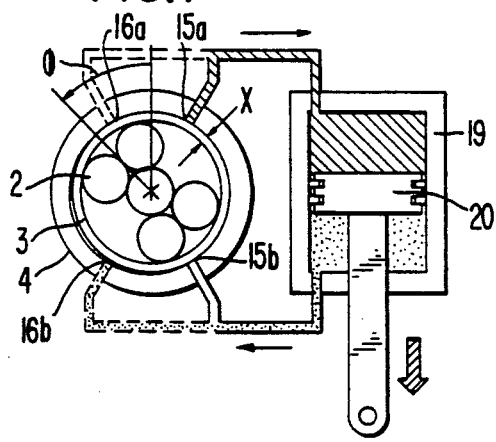
FIG. 7 is a diagrammatic view showing reciprocating operations when a reciprocating type actuator is hydraulically controlled by making use of the fourth preferred embodiment, which shows the state where a piston is urged downwardly.
Figure 8:
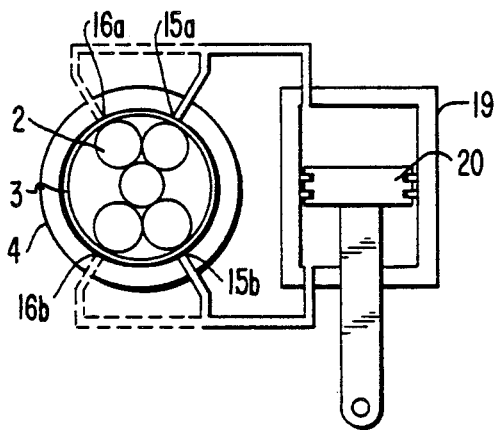
FIG. 8 is a diagrammatic view similar to FIG. 7, but showing the state where a piston is stopped (the actuator being fixed)
Figure 9:
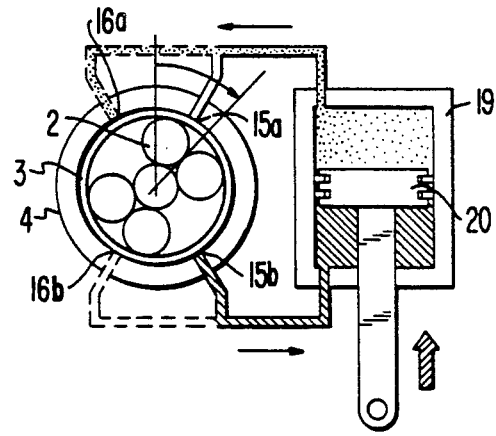
FIG. 9 is a diagrammatic view similar to FIG. 7, but showing the state where a piston is urged upwardly.

This preferred embodiment is an embodiment forming a planetary roller type servo valve for feeding fluid to an actuator consisting of a cylinder 19 and a piston 20 illustrated in FIGS. 7 to 9 while precisely controlling a flow rate, in which component parts similar to those of the first to third preferred embodiments are given like reference numerals and further explanation thereof will be omitted.

Figure 6:
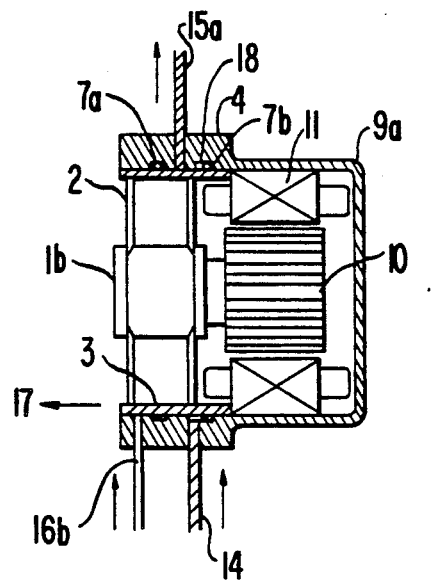
FIG. 6 is a cross-section side view of a fourth preferred embodiment of the present invention.

In FIG. 6, reference numeral 1b denotes a sun roller serving also as an input shaft, which is rotated by a motor rotor 10 and causes planetary rollers 2 on its outer circumference to rotate about their own axes and to revolve around the sun roller 1b. Reference numeral 14 denotes a pressurized fluid inlet, numeral 15a denotes a feed port leading to an actuator, numeral 16b denotes a return port extending from the actuator, numeral 17 denotes a waste oil exhausted through a gap clearance between a ring 3 and a housing 4, numeral 18 denotes a groove formed along the inner circumference of the housing 4 for the purpose of holding seal rings 7a and 7b and receiving inflow of pressurized fluid by communicating with the pressurized fluid inlet 14. Besides, for instance, as shown in FIG. 7 another feed port 15b leading to the actuator is provided symmetrically with respect to the axis of the sun roller 1b, that is, on the lower side as viewed in FIG. 6, in opposition to the feed port 15a leading to the actuator, and also on the same circumferential surface delimited in the axial direction by seal rings 7a and 7b as the feed port 15a leading to the actuator, and another return port 16a extending from the actuator is provided on the upper side as viewed in FIG. 6 in opposition to the return port 16b extending from the actuator, and also on the same circumferential surface delimited on the left side of the seal ring 7a as the return port 16b.

Next, one example of reciprocating operation of an actuator by making use of a planetary roller type servo valve having the above-described construction, will be explained with reference to FIGS. 7 to 9. FIGS. 7 to 9 are diagrammatic views in which the planetary roller type servo valve shown in FIG. 6 is connected to an actuator consisting of a cylinder 19 and a piston 20, they are shown by figures corresponding to a cross-section view taken along line A—A in FIG. 6 as viewed in the direction of arrows, and the feed port 15a leading to the actuator and the return port 16b extending from the actuator shown on the cross-section view taken along line B—B in FIG. 6 as viewed in the direction of arrows are depicted by dash lines. It is to be noted that in these figures, for the purpose of facilitating to understand, only essential parts are shown, and the pressurized fluid inlet 14 and the other components are omitted.

FIG. 7 is a figure showing the state where pressurized fluid (represented by hatching) is fed to the upper side of the piston 20 and the piston 20 is moving in the direction of a hatched arrow (the downward direction), FIG. 8 is a figure showing the state where movement of fluid is not present and the piston 20 is held stopped (the actuator being fixed), and FIG. 9 is a figure showing the state where pressurized fluid is fed to the lower side of the piston 20 on the contrary to FIG. 7 and the piston is moving in the direction of a hatched arrow (the upward direction). Symbol $\phi$ denotes a rotated angle caused by the stepping motor, and symbol X denotes gap clearances produced at two diametrically opposed positions along the circumference between the ring 3 and the housing 4 due to the fact that the ring 3 has its inner side not pressed by the planetary rollers 2. It is to be noted that return fluid coming from the actuator is represented by dotting.

At first, in FIG. 6, pressurized fluid flows into the valve through the pressurized fluid inlet 14 and fills the groove 18. Then it flows into the feed port 15a leading to the actuator where the gap clearance X has arrived at, through the gap clearance X, subsequently it flows into the actuator, and the state shown in FIG. 7 is created. That is, the pressurized fluid strongly urges the piston 20 downwards and causes an object not shown to displace. The fluid on the lower side of the piston 20 becomes return fluid and is exhausted as waste oil 17 via the return port 16b from the actuator where a gap clearance X on the opposite side to the above-mentioned gap clearance X has arrived at, and through the gap clearance X. Under this condition, the feed port 15b leading to the actuator and the return port 16a from the actuator are at the positions where the gap clearance X is zero due to the fact that the ring 3 has its inner side pressed by the planetary rollers 2, and so, they are respectively blocked.

It is to be noted that while the gap clearance X is illustrated in an enlarged scale in FIG. 7 for convenience of explanation, in a practical machine, a gap clearance of such size that pressurized fluid can pass therethrough, for instance, a very small gap clearance of about 0.5 mm or less can suffice. In other words, the gap clearance X between the ring 3 and the housing 4 in FIG. 6 is extremely small as compared to the diameters of the seal rings 7a and 7b, and so, a sealing property of the seal rings 7a and 7b would not be deteriorated by the gap clearance X. Accordingly, the pressurized fluid entered through the pressurized fluid inlet 14 would not leak out to the side of the return ports 16a and 16b extending from the actuator by flowing over the seal ring 7a, nor would not leak out to the side of the stepping motor 9a over the seal ring 7b.

When the sun roller 1b is rotated by the stepping motor 9a, the planetary rollers 2 rotate about their own axes and revolve around the sun roller 1b and the state shown in FIG. 8 has been established, the gap clearances X at all the locations of the feed ports 15a and 15b leading to the actuator and the return ports 16a and 16b extending from the actuator would become zero, and these ports are all blocked. Accordingly, the fluid above and under the piston 20 cannot move, and hence the piston 20 is fixed. In other words, the object not shown is fixed.

When the sun roller 1b is rotated by the stepping motor 9a, the planetary rollers 2 rotate about their own axes and revolve around the sun roller 1b and the state shown in FIG. 9 has been established, the respective gap clearances X would arrive at the locations of the feed port 15b leading to the actuator and the return port 16a extending from the actuator, hence on the contrary to the case shown in FIG. 7, the pressurized fluid flows into the feed port 15b leading to the actuator through the gap clearance X, subsequently it flows into the actuator and enters the chamber on the lower side of the piston 20, and it strongly pushes up the piston 20. And the object not shown is made to displace in the opposite direction to the case of FIG. 7. The fluid on the upper side of the piston 20 becomes return fluid, and is exhausted as waste oil 17 via the return port 16a extending from the actuator where the gap clearance X has arrived at and through the gap clearance X. In this way, rotation of the stepping motor 9a is precisely controlled by easily controllable electric signals, and reciprocating motions of the actuator can be controlled precisely.

Figure 10:
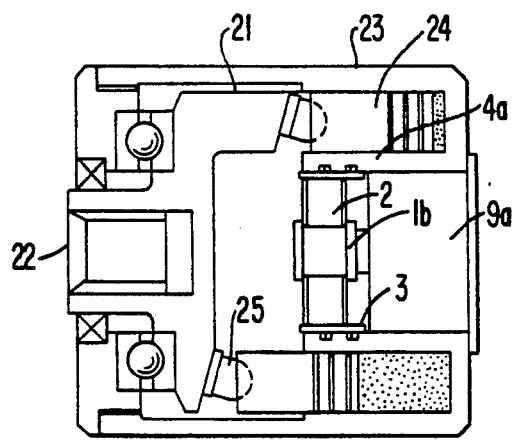
FIG. 10 is a cross-section side view of a fifth preferred embodiment of the present invention.
Figure 11:
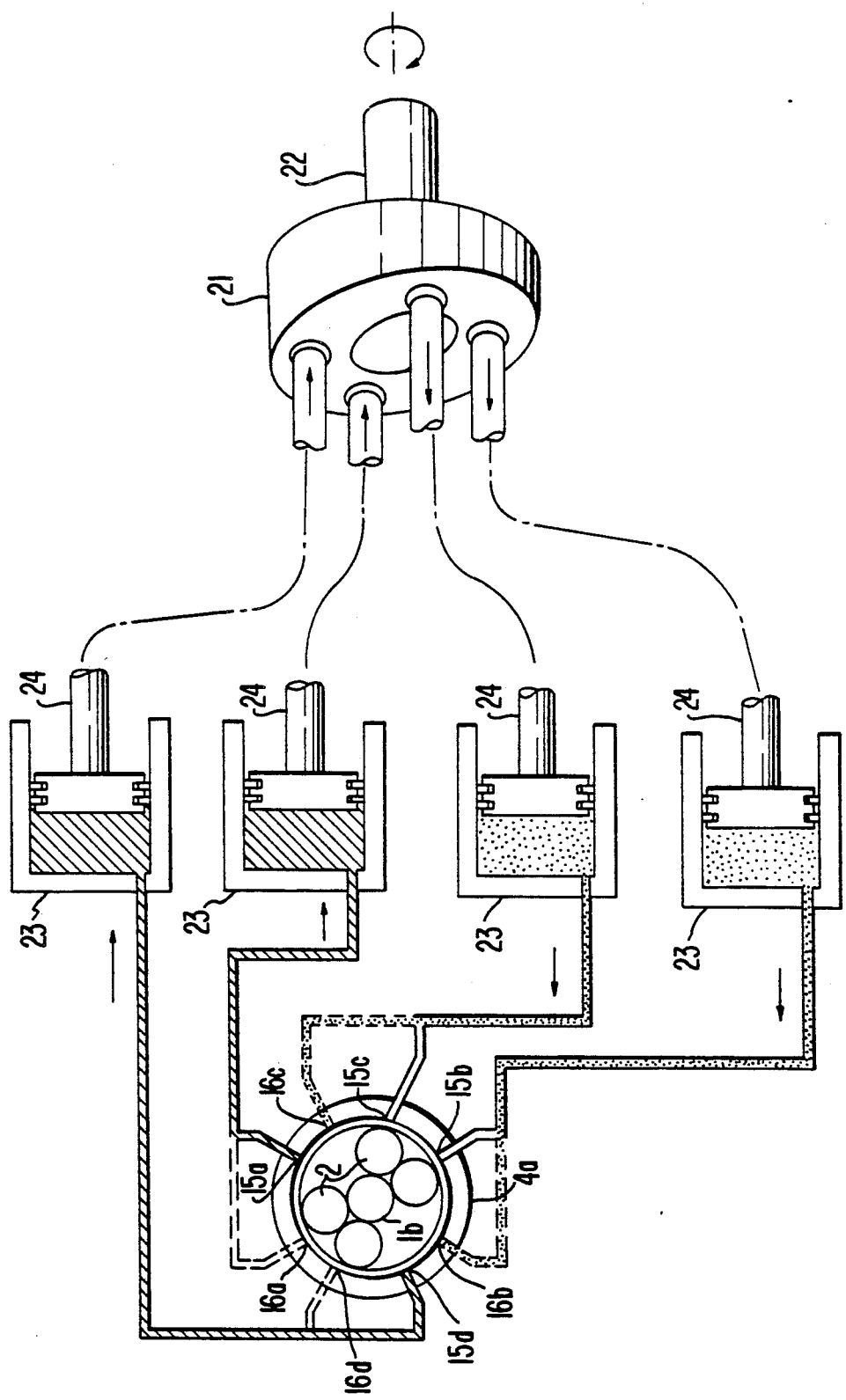
FIG. 11 is a diagrammatic view showing operations of the fifth preferred embodiment in a disintegrated form.
Figure 12:
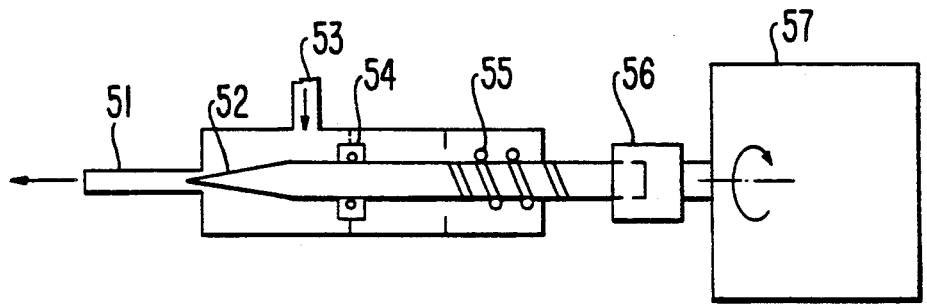
FIG. 12 is a cross-section side view of one example of the flow control valve in the prior art.
Figure 13:
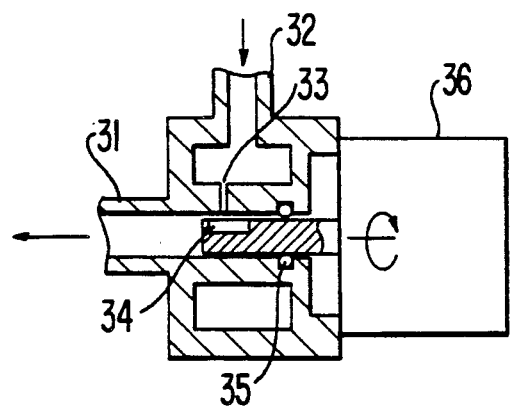
FIG. 13 is a cross-section side view of another example of the flow control valve in the prior art.
Figure 14:
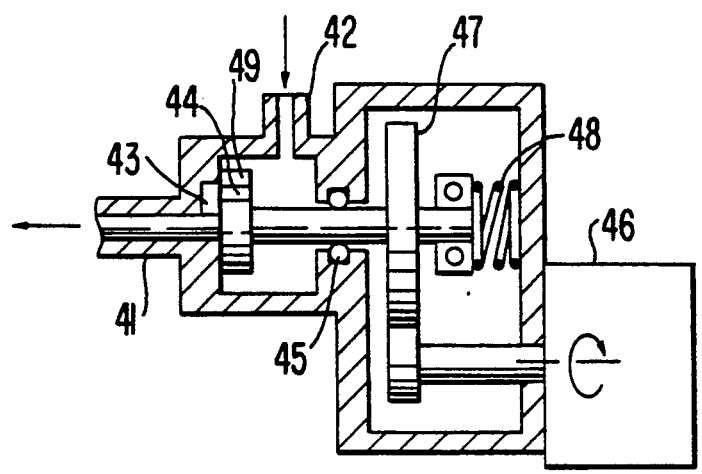
FIG. 14 is a cross-section side view of still another example of the flow control valve in the prior art.

Next, description will be made on a fifth preferred embodiment of the present invention with reference to FIGS. 10 and 11. This preferred embodiment is an example of a rotary actuator, in which the planetary roller type servo valve shown in FIG. 6 and the so-called swash plate type hydraulic rotary machine are integrally combined and reciprocating motions of pistons controlled by the planetary roller type servo valve are converted into a rotary motion and then taken out. FIG. 10 is a cross-section side view of this preferred embodiment, and FIG. 11 is a diagrammatic view for explaining the operation of this preferred embodiment by disintegrated illustration. Component members similar to those shown in FIG. 6 are given like reference numeral, and further explanation thereof will be omitted.

In FIG. 10, generally the portion in the proximity of the center of the right-hand section forms a planetary roller type servo valve, and the other portion forms a swash plate type hydraulic rotary machine. Reference numeral 4a denotes a housing of a planetary roller type servo valve, one end of which is continuous to cylinders 23 to be described later. Reference numeral 21 designates a swash plate, numeral 22 denotes an output shaft which is continuous to the swash plate 21, and four cylinders 23 are disposed at equal angular intervals about the axis of the output shaft 22 with their axes held in parallel to one another. In the cylinders 23 are respectively accommodated pistons 24 so as to be able to reciprocate in the axial direction, and the respective tip portions of the pistons 24 are universally coupled to the swash plate 21 via universal couplings. The universal couplings 25 are slidable along the coupling surface to the swash plate 21, and even if the output shaft 22 rotates about its own axis, they do not displace in the directions perpendicular to the axis but they displace only in the axial direction according to the degree of inclination of the swash plate 21. Accordingly, the pistons 24 universally coupled to the swash plate 21 would displace within the respective cylinders in the axial direction of the cylinders.

Next, the operation of the hydraulic rotary machine having the above-described construction will be explained with reference to FIG. 11. The left-hand portion of this figure illustrates a planetary roller type servo valve, which is similar, in principle, to the case of the fourth preferred embodiment shown in FIG. 7. However, in the case of this preferred embodiment, only difference resides in that as shown in FIG. 11, feed ports 15c and 15d leading to the actuator and return ports 16c and 16d extending from the actuator are additionally provided at two opposed locations on the opposite sides of the axis of the sun roller 1b so as to equally divide the angular intervals of the respective pairs of the feed ports 15a and 15b leading to the actuator and the return ports 16a and 16b extending from the actuator. When the sun roller 1b rotates, the planetary rollers 2 rotate about their own axes and revolve around the sun roller 1b, and for instance, pressurized fluid is fed to the tip end side of the piston 24 by an operation similar to the case of FIG. 7 to push and move the piston 24. Then the swash plate 21 rotates about the axis of the output shaft 22. Since the piston 24 on the opposite side of the axis of the output shaft 22 is pushed back in the opposite direction by the swash plate 21, the fluid on the tip end side of the piston 24 becomes return fluid and returns to the planetary roller type servo valve to be exhausted. This operation is sequentially repeated around the axis of the output shaft 22, and the output shaft transmits a strong torque and precise rotation to the object not shown. It is to be noted that while this preferred embodiment has been described in connection to an example provided with four pistons 24, so long as the number is such number that the swash plate 21 may not produce a rotational dead point, that is, so long as there are three pistons in the case where pistons are disposed so as to nearly equally divide the circumference of the swash plate 21 into three about the axis of the output shaft 22, or more pistons, any number of pistons could be employed within the scope where the gap clearance between the ring 3 and the housing 4a and the positional relationship where it is blocked.

As will be apparent from the above description of the preferred embodiments, owing to the above-described structural features, the present invention offers the following advantages:

(1) Since a gap clearance formed by a difference in diameter of planetary rollers is utilized, a flow rate can be controlled precisely.
(2) As a location where small areas push against each other or slide along each other is not present, the valve is excellent in abrasion-resistance.
(3) There is no fear of intercepted by foreign matters, because the valve does not include a slit.
(4) A frictional loss is small, because a location where members slide at a high speed as urged by a spring or the like does not exist.
(5) Since revolution of planetary rollers is utilized, a large torque as well as precise timing can be realized.

While a principle of the present invention has been described above in connection to a number of preferred embodiments of the invention, it is intended that all matter contained in the above description and illustrated in the accompanying drawings shall be interpreted to be illustrative and not as a limitation to the scope of the invention.

What is claimed is:

1. A planetary roller type flow control valve comprising a plurality of planetary rollers having different diameters from one another and being externally contiguous to a roller serving also as an input shaft, a ring being internally contiguous to said planetary rollers and having a predetermined width in its axial direction, a housing fitting around said ring with its inner circumference partly kept in contact with the outer circumference of said ring and held coaxial and liquid-tight with respect to said roller serving also as an input shaft, a fluid inlet provided at one angular position of the inner circumference of said housing so as to be interceptable by the predetermined width of said ring, and a fluid outlet provided at another angular position of the inner circumference of said housing so as to be interceptable by the predetermined width of said ring.

2. A planetary roller type flow control valve as claimed in claim 1, wherein said input shaft serves also as a rotary shaft of a driving device.

3. A planetary roller type flow control valve as claimed in claim 2, wherein said planetary rollers serve also as bearings for the rotary shaft of the driving device.

4. A planetary roller type flow control valve as claimed in claim 1, wherein said fluid outlet is provided in multiple on the inner circumference of said housing.

5. A planetary roller type flow control valve as claimed in claim 1, wherein the fluid issued from the fluid outlet is adapted to be fed as working fluid of an actuator.

6. A planetary roller type flow control valve as claimed in claim 1, wherein the fluid issued from the fluid outlet is adapted to be fed as working fluid of a swash plate type rotary machine.

7. A planetary roller type flow control valve as claimed in claim 1, which further comprises a circumferential groove formed in the housing along the circumference of the ring and opening at the contact surface between the housing and the ring, and a seal ring provided within said circumferential groove.

8. A planetary roller type flow control valve as claimed in claim 2, wherein said driving device is a stepping motor.

9. A planetary roller type flow control valve as claimed in claim 2, wherein the fluid issued from the fluid outlet is adapted to be fed as working fluid of an actuator.

10. A planetary roller type flow control valve as claimed in claim 3, wherein the fluid issued from the fluid outlet is adapted to be fed as working fluid of an actuator.

11. A planetary roller type flow control valve as claimed in claim 4, wherein the fluid issued from the fluid outlet is adapted to be fed as working fluid of an actuator.

12. A planetary roller type flow control valve as claimed in claim 2, wherein the fluid issued from the fluid outlet is adapted to be fed as working fluid of a swash plate type rotary machine.

13. A planetary roller type flow control valve as claimed in claim 3, wherein the fluid issued from the fluid outlet is adapted to be fed as working fluid of a swash plate type rotary machine.

14. A planetary roller type flow control valve as claimed in claim 4, wherein the fluid issued from the fluid outlet is adapted to be fed as working fluid of a swash plate type rotary machine.

15. A planetary roller type flow control valve as claimed in claim 2, which further comprises a circumferential groove formed in the housing along the circumference of the ring and opening at the contact surface between the housing and the ring, and a seal ring provided within said circumferential groove.

16. A planetary roller type flow control valve as claimed in claim 3, which further comprises a circumferential groove formed in the housing along the circumference of the ring and opening at the contact surface between the housing and the ring, and a seal ring provided within said circumferential groove.

17. A planetary roller type flow control valve as claimed in claim 4, which further comprises a circumferential groove formed in the housing along the circumference of the ring and opening at the contact surface between the housing and the ring, and a seal ring provided within said circumferential groove.

* * * * *